UNITED STATES PATENT OFFICE.

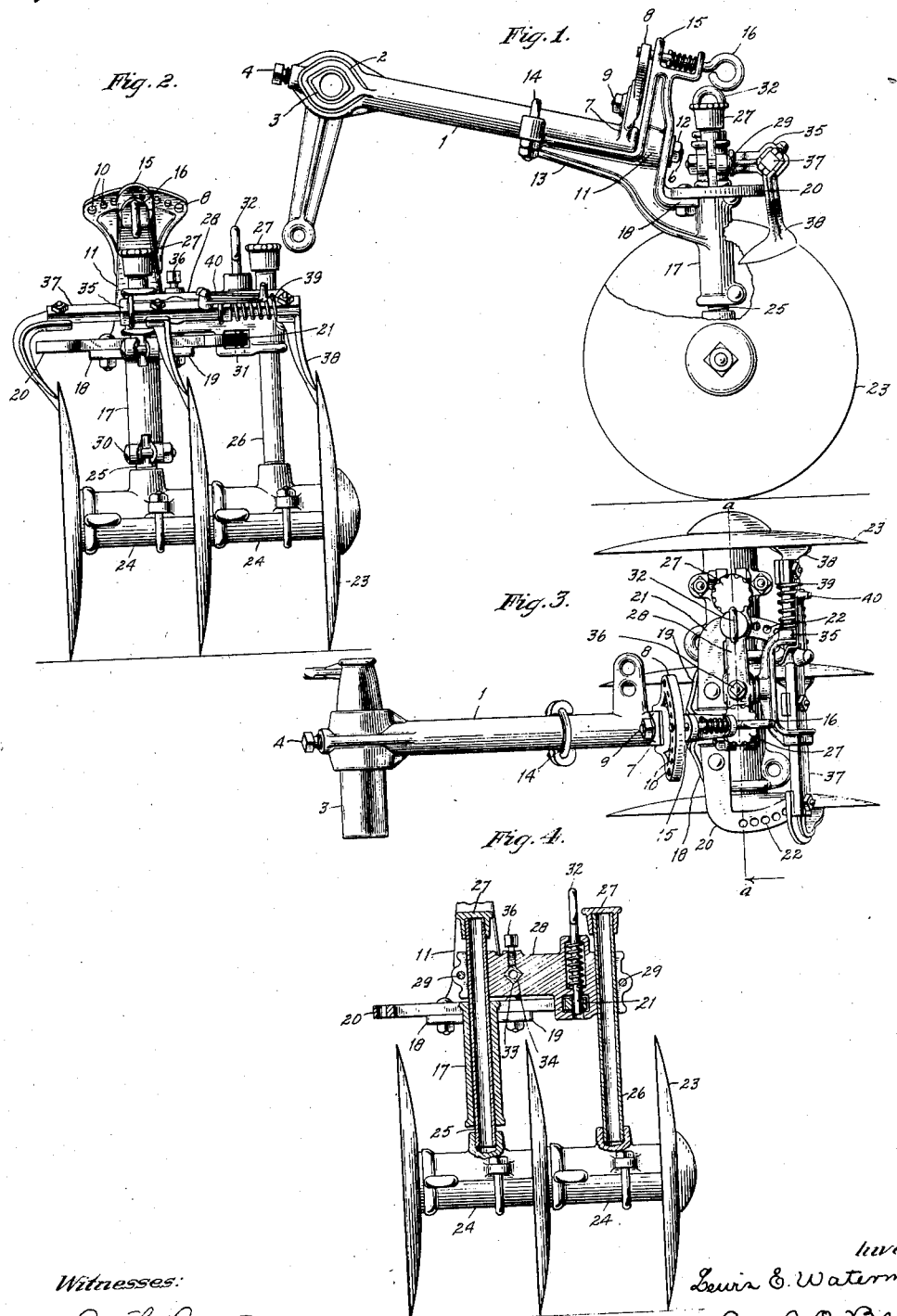

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

DISK CULTIVATOR.

1,042,991.  Specification of Letters Patent.  Patented Oct. 29, 1912.

Application filed December 19, 1911. Serial No. 666,860.

*To all whom it may concern:*

Be it known that I, LEWIS E. WATERMAN, a citizen of the United States, residing at Rockford, in the county of Winnebago and State of Illinois, have invented certain new and useful Improvements in Disk Cultivators, of which the following is a specification.

The object of this invention is to construct a disk gang to be supported by the beam of a cultivator in which the disks are capable of being reversed also oscillated on a horizontal pivot.

In the accompanying drawings, Figure 1 is a side elevation. Fig. 2 is a rear elevation. Fig. 3 is a plan view. Fig. 4 is a section on line a a Fig. 3.

In the drawings I have shown my improvements in connection with a beam of a cultivator and have not deemed it necessary to show the cultivator complete as the connection of the beam at its forward end to the supporting frame of the cultivator may be accomplished in various manners. The beam 1 in this instance is tubular and has a transverse opening 2 at its forward end which receives the tubular transverse sleeve 3 adapted to be supported by the frame of a cultivator. A set screw 4 connects the beam with the sleeve in an adjustable manner. The rear end of the beam 1 is closed and is formed with a hole through which a bolt 6 is inserted. A projection 7 is located near the rear end of the beam and extends upward therefrom. To this projection is secured a segment 8 by the bolt 9 and said segment is provided with a series of holes 10. At the rear end of the beam is secured a bracket 11 by the bolt 6 extending through it and held in place by the nut 12. From this bracket extends an arm 13 which lies against the underface of the beam, and its forward end is clamped to the beam by the U bolt 14. From the bracket extends an extension 15 which supports a spring actuated plunger 16 at its upper end, and which is adapted to enter the holes 10 in the segment 8 which will form a connection between the bracket and beam in a manner to allow of the oscillation of the bracket on the bolt 6 as a pivot. From the bracket 11 depends a sleeve 17, and from this bracket extend two wings 18 and 19 to which are connected the curved arms 20 and 21 respectively each of which is formed with holes 22. The disks 23 are supported by the boxes 24 to which are connected two pipe sections 25 and 26 having their upper ends closed by the screw-threaded caps 27. The upper ends of these pipe sections are connected by a bar 28 and clamped in connection therewith by the bolts 29. The said pipe sections and bar constitute in effect a disk carrier. The pipe section 25 is located in the sleeve 17 and the bolts 30 clamp the sleeve around the pipe section in a manner to allow of the oscillation of the pipe section therein. A loop 31 depends from the underface of the bar 28 near the pipe section 26 and receives one of the wings 20 or 21. A spring actuated plunger 32 is supported by the bar 28 and is adapted to enter the holes 22 in the wings 20 or 21. The bar 28 is formed with a hole 33 which receives a stud 34 extending from the yoke 35 and a set screw 36 holds the stud in connection with the bar. The yoke 35 supports a scraper bar 37 which is capable of a reciprocating movement in connection therewith. To the bar 37 are secured scrapers 38 which are located to contact with the concave faces of the disks 23. A spring 39 is coiled around the scraper bar 37 one end resting against the yoke 35 and its other end against one of the scrapers 38. A cam lever 40 is pivoted to the scraper bar and is located to rest in contact with the yoke 35. By a movement of the cam lever the scrapers can be held free of the disks and when the cam lever is released, the spring 39 will force the scrapers into contact with the disks. The bracket supporting the disks can be rocked on the horizontal axis and held by the spring actuated plunger 16, so as to level the disks or hold them in a tipped position. By releasing the spring actuated plunger 32 the faces of the disks can be reversed so as to turn the earth in the opposite direction and the angle at which they are held is regulated by the series of holes 22 receiving the plunger 32. When the position of the disks is changed, the yoke 35 carrying the scraper bar and scrapers will be changed to the other face of the bar 28.

I claim as my invention.

1. In a device of the character set forth, the combination with a beam, of a bracket comprising angularly disposed arms, one of which extends longitudinally of the beam, clamping means carried thereby and surrounding the beam, the other arm being journaled on the rear end of the beam, and a disk gang mounted on the bracket.

2. In a device of the character set forth, the combination with a beam, of a bracket comprising angularly disposed arms, one of which extends longitudinally of the beam and is connected at its front end thereto, the other being journaled on the rear end of the beam, means mounted on the latter arm for holding the bracket against turning and in different adjusted positions, and a disk gang mounted on the bracket.

3. In a device of the character set forth, the combination with a beam having an upstanding segment, of a bracket journaled on the beam and having connections therewith on opposite sides of the segment, holding means carried by the bracket and engaging the segment for securing said bracket in different adjusted positions, and a disk gang mounted on the bracket.

4. In a device of the character set forth, the combination with a beam having an upstanding segment at its rear end, of a bracket comprising angularly disposed arms, one of which extends longitudinally of the beam, clamping means carried by said arm and surrounding said beam on one side of the segment, the other arm being journaled on the beam on the opposite side of the segment, a holding bolt mounted on the latter arm and adjustably engaging the segment, said bracket furthermore having a substantially vertical journal sleeve, and a disk gang having a pivot element journaled on the sleeve.

5. In a device of the character set forth, the combination with a bracket, of means for mounting the bracket on a beam, said bracket having a substantially vertical journal bearing, a disk carrier including a pivot element journaled in the bracket bearing, arms extending from the pivot element above and below said bearing, and a connection between the arms at one side of the pivot element, means for securing the carrier in different positions, and disks journaled on the carrier.

6. In a device of the character set forth, the combination with a bracket, of means for mounting the bracket on a beam, said bracket having a substantially vertical bearing sleeve and curved arms on opposite sides of the same, a disk carrier including a pivot element journaled in the bracket and having upper and lower arms arranged above and below the sleeve, the upper arm having a socket to receive the curved arms, a vertical connection between the arms at one side of the pivot element and bracket, a holding bolt that engages the arms, and disks journaled on the carrier.

7. In a device of the character set forth, the combination with a beam having an upstanding segment, of a bracket comprising angularly disposed arms journaled on the beam on opposite sides of the segment, means carried by one of the arms and engaging the segment for holding the bracket in different positions, said bracket having a substantially vertical sleeve and curved arms on opposite sides of the same, a disk gang, spaced upright members carried thereby, one of said members being journaled on the sleeve, an arm connecting the upper ends of the members and having a socket to receive the curved arms of the bracket, and means carried by said upper arm and engaging the curved arms to hold the disks in different positions.

In testimony whereof I have hereunto set my hand in presence of two subscribing witnesses.

LEWIS E. WATERMAN.

Witnesses:
  A. O. BEHEL,
  E. D. E. N. BEHEL.